US008432935B2

(12) United States Patent
El-Maleh et al.

(10) Patent No.: US 8,432,935 B2
(45) Date of Patent: *Apr. 30, 2013

(54) TANDEM-FREE INTERSYSTEM VOICE COMMUNICATION

(75) Inventors: Khaled El-Maleh, San Diego, CA (US); Ananthapadmanabhan A. Kandhadai, San Diego, CA (US); Sharath Manjunath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 852 days.

This patent is subject to a terminal disclaimer.

(21) Appl. No.: 12/181,972

(22) Filed: Jul. 29, 2008

(65) Prior Publication Data

US 2008/0288245 A1 Nov. 20, 2008

Related U.S. Application Data

(63) Continuation of application No. 10/313,264, filed on Dec. 6, 2002, now Pat. No. 7,406,096.

(51) Int. Cl.
*H04J 3/16* (2006.01)
*G10L 11/06* (2006.01)

(52) U.S. Cl.
USPC .......................... 370/466; 704/214; 704/215

(58) Field of Classification Search .................. 370/466, 370/474, 528, 335, 342, 352; 455/517, 522, 455/69, 701; 704/233, 200, 275, 270.1, 220, 704/214, 246, 221, 215, 258, 202, 226
See application file for complete search history.

(56) References Cited

U.S. PATENT DOCUMENTS

| 5,673,268 | A  | * | 9/1997  | Sharma et al. ............... 370/522 |
|-----------|-----|---|---------|--------------------------------------|
| 5,812,965 | A  |   | 9/1998  | Massaloux                            |
| 6,233,320 | B1 | * | 5/2001  | Haimi-Cohen ............ 379/88.27    |
| 6,463,274 | B1 | * | 10/2002 | Robertson ..................... 455/406 |
| 6,504,838 | B1 | * | 1/2003  | Kwan ........................... 370/352 |
| 6,577,862 | B1 |   | 6/2003  | Davidson et al.                      |
| 6,615,169 | B1 |   | 9/2003  | Ojala et al.                         |
| 6,628,967 | B1 | * | 9/2003  | Yue ............................... 455/557 |
| 6,691,084 | B2 | * | 2/2004  | Manjunath et al. ........... 704/221   |
| 6,721,712 | B1 | * | 4/2004  | Benyassine et al. .......... 704/503   |

(Continued)

FOREIGN PATENT DOCUMENTS

EP  0981253  8/1999

OTHER PUBLICATIONS

"Tandem Free Operation (Stage 1)" 3rd Generation Partnership Project 2, 'online Dec. 13, 1999; p. 01-09: retrieved from the Internet:<URL.www.3gpp2.org.; retrieved on May 6, 2004.

(Continued)

*Primary Examiner* — Dominic E Rego
(74) *Attorney, Agent, or Firm* — Michael DeHaemer; Espartaco Diaz Hidalgo

(57) ABSTRACT

Techniques are presented herein to provide tandem-free operation between two wireless terminals through two otherwise incompatible wireless networks. Specifically, embodiments provide tandem-free operation between a wireless terminal communicating through a continuous transmission (CTX) wireless channel to a wireless terminal communicating through a discontinuous transmission (DTX) wireless channel. In a first aspect, inactive speech frames are translated between DTX and CTX formats. In a second aspect, each wireless terminal includes an active speech decoder that is compatible with the active speech encoder on the opposite end of the mobile-to-mobile connection.

27 Claims, 7 Drawing Sheets

U.S. PATENT DOCUMENTS

| | | |
|---|---|---|
| 6,782,361 B1 * | 8/2004 | El-Maleh et al. ............. 704/226 |
| 7,010,300 B1 | 3/2006 | Jones et al. |
| 7,023,819 B2 | 4/2006 | Falsafi |
| 7,080,010 B2 | 7/2006 | Shlomot et al. |
| 7,180,892 B1 | 2/2007 | Tackin |
| 7,319,703 B2 | 1/2008 | Lakaniemi et al. |
| 7,406,096 B2 | 7/2008 | El-Maleh et al. |
| 2002/0042284 A1 | 4/2002 | Benoist et al. |
| 2002/0052738 A1 * | 5/2002 | Paksoy et al. ................ 704/219 |
| 2002/0072899 A1 | 6/2002 | Paksoy et al. |
| 2002/0101844 A1 | 8/2002 | El-Maleh et al. |
| 2002/0105917 A1 | 8/2002 | Rabipour et al. |
| 2003/0065508 A1 * | 4/2003 | Tsuchinaga et al. .......... 704/215 |
| 2003/0095507 A1 | 5/2003 | Chen et al. |
| 2003/0182108 A1 | 9/2003 | Proctor et al. |
| 2003/0212550 A1 | 11/2003 | Ubale |
| 2004/0002856 A1 * | 1/2004 | Bhaskar et al. ............... 704/219 |
| 2005/0267746 A1 | 12/2005 | Jelinek et al. |

OTHER PUBLICATIONS

International Search Report, PCT/US03/038805, International Searching Authority, European Patent Office, Jun. 21, 2004.

* cited by examiner

TANDEM-FREE INTERSYSTEM VOICE COMMUNICATION

RELATED APPLICATIONS

The present Application for Patent is a continuation of patent application Ser. No. 10/313,264 entitled "TANDEM-FREE INTERSYSTEM VOICE COMMUNICATION" filed Dec. 6, 2002, pending, and assigned to the assignee hereof and hereby expressly incorporated by reference herein.

BACKGROUND

1. Field

The present invention relates generally to voice data communication and particularly to providing tandem-free communications between wireless communication systems having different native vocoder types.

2. Description of the Related Art

The field of wireless communication includes many applications such as wireless telephones, paging, wireless local loops, personal digital assistants (PDAs), Internet telephony, and satellite communication systems. Various over-the-air interfaces developed for such wireless communication systems include frequency division multiple access (FDMA), time division multiple access (TDMA), and code division multiple access (CDMA).

In order to maximize voice quality and system capacity, many wireless communication systems have been designed to use digital compression of voice data. Such digital compression is used to compress a digitized speech signal into a low-bit-rate signal that can be accommodated by wireless data channels having limited bandwidth or throughput capacity. This digital compression of voice data is referred to as speech coding or vocoding. Speech coding is used in wireless communication systems designed in accordance with various well-known CDMA wireless standards such as the TIA/EIA IS-95 standard and its progeny, W-CDMA, cdma2000. In addition, speech coding is used in wireless communication systems designed in accordance with TDMA standards such as North American TDMA and GSM.

Many current speech coders operate by extracting parameters relating to a model of human speech generation and then using these parameters to compress the speech for transmissions. A speech coder typically includes an encoder and a decoder to accommodate bi-directional speech communication. The encoder receives as input a continuous stream of digital voice data samples representative of a speech signal. The encoder divides the incoming speech signal into blocks of time, or analysis frames. The encoder then analyzes the analysis frames to extract certain relevant parameters and incorporates the parameter information into digital speech frames. The decoder receives digital speech frames as input and extracts or reproduces speech parameter information from the digital speech frames. The decoder then resynthesizes the analysis frames using the speech parameter information. Speech coders are also referred to as voice coders, or "vocoders," and the terms will be used interchangeably herein.

Different types of speech coders have been proposed or deployed for use in various wireless communication systems. The different types of speech coders often employ substantially dissimilar speech compression techniques and digital speech frame formats. In general, a digital speech frame generated using a particular speech encoder can only be properly decoded using a decoder of the corresponding type.

In addition to using different types of speech compression, speech coders may also differ based on the type of wireless interface to be used between a wireless terminal and a wireless network. Some wireless networks require continuous transmissions, even when there is no speech activity (the user is not speaking). Other wireless networks permit the wireless terminal to stop transmitting entirely during such periods of speech inactivity. During periods of speech inactivity, speech coders used in continuous transmission (CTX) wireless systems are designed to provide a continuous series of small, or low-rate frames such as eighth-rate frames containing minimal audio information. In contrast, speech coders used in discontinuous transmission (DTX) wireless systems are designed to generate a single frame at the beginning of a period of speech inactivity and then to generate no frames until speech activity resumes. The frame generated at the beginning of a period of speech inactivity is referred to as a silence descriptor (SID) frame. The decoder used in DTX wireless systems use the data within a single SID frame to generate speechless "comfort noise" over multiple frame periods. The CTX and DTX approaches to providing some comfort noise during periods of speech inactivity are generally incompatible. In other words, a DTX decoder cannot decode an eighth-rate CTX frame. Similarly, a CTX decoder cannot decode a SID frame.

A wireless communication system generally supports two types of voice calls based on whether one or both conversing parties are using wireless terminal equipment. In a mobile-to-land call, a first party uses a wireless terminal to converse with a second party who is using landline terminal equipment. In a mobile-to-mobile call, both parties converse using wireless terminals.

For example, a mobile-to-land call is established between a cellular phone user and a person using a landline phone. In such a connection, the voice signal of a person speaking into the microphone of the cellular phone is digitized and encoded before the cellular phone transmits the resultant digital speech frames to a wireless communication network. The wireless communication network decodes the digital speech frames and converts them into an uncompressed digital or analog speech signal to a landline telephone network (also referred to as a "plain old telephone system" or POTS network). The landline, or POTS, network then transports the uncompressed speech signal to the landline phone, and the landline phone amplifies the speech signal into the speaker built-in to the landline terminal. The processing of speech data in the opposite direction (from the person speaking into the microphone of the landline phone to the signal emitted from the speaker built-in to the cellular phone) is substantially the reverse process of the one just described, with the speech encoding occurring in the wireless communication network and the decoding occurring in the cellular phone.

An example of a mobile-to-mobile call is established between two users of cellular phones. In such a connection, each cellular phone digitizes and encodes the speech signal of its respective user and provides the digital speech frames to one or more wireless communication networks. In some networks, the wireless communication network decodes and then re-encodes the digital speech frames received from a first cellular phone before sending the re-encoded speech frames to the second cellular phone. Such decoding and re-encoding of the speech data, also known as tandem vocoding, causes additional delays in the transmission of speech data between the two cellular phone. More importantly, decoding and re-encoding of speech data causes needless degradation of the voice quality of the speech signal eventually emanating from the built-in speaker of the destination cellular phone. In order to avoid such delay and voice quality degradation, many wireless communication networks are designed to deliver a digital speech frame received from a first wireless terminal to a second wireless terminal essentially unchanged. Such "tandem-free" operation avoids the delay and voice quality degradation inherent in tandem vocoding.

The greatest voice quality achievable in a POTS network is limited by various legacy parameters of landline phone systems. For example, each unidirectional voice data stream in a POTS network is carried within a pulse code modulation (PCM) channel. A PCM channel is characterized by a 64-kbps (kilobit per second) channel comprised of 8,000 8-bit voice samples per second. The 8,000 samples-per-second sampling rate limits the fidelity of the speech that can be sent through a PCM channel. Specifically, only voice frequencies below 4 KHz (kilohertz) can be transmitted through a PCM channel.

Many existing and proposed wireless communication networks utilize internal channels that are capable of data rates higher than 64 kbps. In order to provide better voice quality through such networks, new "wideband speech coders" have been proposed that use higher sampling rates than 8,000 samples per second, and are thus able to capture voice frequencies above 4 KHz. The voice quality achieved using wideband speech coders in tandem-free operation for mobile-to-mobile calls exceeds the voice quality that is possible when voice data is transmitted through a PCM channel. So long as the voice signal is never reduced, even temporarily, to PCM channel format, tandem-free operation enables the use of voice coders that can achieve better voice quality in a mobile-to-mobile call than is possible in a mobile-to-land call.

If the cellular phones in the previous example have speech coders of different types, tandem-free operation is generally not possible. A decoder using one type of speech coding cannot properly decode a digital speech frame encoded using a different type of encoder. Decoding the speech signal using a decoder of the first type within the wireless communication network, and then re-encoding the speech signal using an encoder of the second type will enable the receiving wireless terminal to reproduce an intelligible speech signal. However, as discussed above, this speech signal will suffer from added delay and speech quality degradation.

CDMA standards such as IS-95 and cdma2000 support the use of variable-rate vocoder frames in a spread spectrum environment, while standards based on GSM standards, such as W-CDMA, support the use of fixed-rate vocoder frames and multi-rate vocoder frames. Similarly, Universal Mobile Telecommunications Systems (UMTS) standards also support fixed-rate and multi-rate vocoders, but not variable-rate vocoders. An example of a variable-rate vocoder is the Selectable Mode Vocoder (SMV), which is promulgated in TIA IS-893. An example of a multi-rate vocoder is the Adaptive Multi-Rate (AMR) vocoder, which is promulgated in "ETSI EN 301 704 Digital Cellular Telecommunications System; Adaptive Multi-Rate (AMR) Speech Transcoding" (the AMR standard); and an example of a fixed-rate vocoder is a Enhanced Full Rate vocoder, which is promulgated in 3GPP TS 46.060: "Digital cellular telecommunications system (Phase 2+); Enhanced Full Rate (EFR) speech transcoding."

A typical wireless communication network supports only one type of speech coder. The selection of a speech coder types is often tightly coupled to the type of wireless interface utilized by the wireless communication network. For example, IS-95 and cdma2000 networks use continuous transmission (CTX) wireless interfaces that are most compatible with variable-rate speech coders. A variable-rate speech coder can encode active speech data using any of multiple different data rates, varying the frame-by-frame data rate based on speech activity. A variable-rate speech coder provides one speech frame for every speech frame period. A conventional variable-rate speech coder for CTX CDMA systems encodes active speech at either full-rate, half-rate, or quarter-rate depending on speech activity. The same speech coder generates eighth-rate frames during pauses in speech. Decoding an eighth-rate frame produces "comfort noise." Because the rate of frames depends upon the characteristics of data received from the "source," variable rate speech coders are called "source-controlled."

In contrast to CTX networks, W-CDMA networks utilize a discontinuous transmission (DTX) wireless interface. An adaptive multi-rate (AMR) vocoder is an example of a vocoder designed for use with a DTX network, for example a W-CDMA network. Rather than varying the data rate of voice frames based on speech activity, an AMR vocoder varies an active speech data rate, or "mode," based on channel quality and generates discontinuous inactive speech data frames. An AMR speech encoder uses a single data rate for active speech data, and transmits inactive speech using a combination of silence indicator (SID) frames followed by empty speech frame periods. On the receiving end, an AMR speech decoder decodes active speech frames, and generates comfort noise for empty speech frame periods occurring after and between received SID frames. Each AMR mode is characterized by a data rate used for active speech. When characteristics such as noise limit the capacity of the wireless channel being used to transmit AMR frames, the AMR mode can be adjusted so as not to exceed the capacity of the channel. This type of rate control is referred to as "channel-controlled."

Different speech coders may utilize different and mutually incompatible algorithms. Thus, a SMV speech decoder cannot decode a speech data frame generated by an AMR speech encoder, and vice versa. In addition, the different handling of periods of speech inactivity leads to further incompatibilities between speech coders. For example, an SMV speech decoder requires at least an eighth-rate frame for every speech frame period, while an AMR speech decoder can generate multiple frames of comfort noise following the receipt of a single SID frame.

A conventional wireless communication network is generally incapable of providing tandem-free or even tandem vocoding between two wireless terminals that use different types of speech coder in an intra-system mobile-to-mobile call. As customers become more accustomed to the high quality available with wideband speech coders, and as carriers widely deploy different types of wireless communication networks, demand will increase for inter-system mobile-to-mobile calls that provide wideband speech quality. There is therefore a need in the art for a way to provide tandem-free operation between wireless terminals that use different types of speech coder or communicate using different types of wireless interface.

SUMMARY

Methods and apparatus are presented herein to provide tandem-free operation between two wireless terminals through two otherwise incompatible wireless networks. Specifically, embodiments provide tandem-free operation between a wireless terminal communicating with a continuous transmission (CTX) wireless network to a wireless terminal communicating with a discontinuous transmission (DTX) wireless network.

In one aspect, a first speech coder is configured to encode active speech frames using a format associated with a continuous transmission (CTX) wireless interface, to decode active speech frames using a format associated with a discontinuous transmission (DTX) wireless interface, and to encode and decode comfort-noise frames using a format associated with a CTX wireless interface. A second speech coder is configured to encode active speech frames using a format associated with a DTX wireless interface, to decode active speech frames using a format associated with a CTX wireless interface, and to encode and decode comfort-noise frames using a format associated with a DTX wireless interface. A wireless network provides a connection between a wireless terminal having the first speech coder and a wireless terminal having the second speech coder. The wireless network includes a comfort-noise frame converter configured to convert CTX comfort noise frames into DTX comfort noise frames and to convert DTX comfort noise frames into CTX comfort noise frames.

In another aspect, the first speech coder and the second speech coder are of a common type capable of encoding and decoding both types of comfort noise frames. In this second aspect, the common speech coder resides in both wireless terminals that communicate through different types of wireless networks. The common speech coder encodes active speech frames the same way through either a CTX or DTX wireless network, but encodes comfort-noise frames differently depending on the type of wireless network. The common speech coder within a wireless terminal encodes and decodes comfort-noise frames using a CTX format when the wireless terminal is communicating directly with a CTX wireless network. Similarly, the common speech coder within a wireless terminal encodes and decodes comfort-noise frames using a DTX format when the wireless terminal is communicating directly with a DTX wireless network. Where a tandem-free call involves both a CTX and a DTX wireless network, the wireless networks include a comfort-noise frame converter configured to convert CTX comfort noise frames into DTX comfort noise frames and to convert DTX comfort noise frames into CTX comfort noise frames.

In yet another aspect, each speech coder operates as described above except that it uses a different encoding technique for comfort-noise frames than the decoding technique. For example, a speech coder residing within a wireless terminal that communicates directly with a DTX wireless network encodes comfort noise using DTX frames, but decodes received CTX comfort noise frames. Conversely, a speech coder residing within a wireless terminal that communicates directly with a CTX wireless network encodes comfort noise using CTX frames, but decodes received DTX comfort noise frames. This type of tandem-free operation requires the wireless networks to process comfort-noise frames in a way other than the comfort-noise frame conversion described above. For example, multiple eighth-rate CTX comfort-noise frames are not converted into a single SID frame. Instead, a wireless network changes modes based on frame type and encapsulates each eighth-rate CTX frame into a separate frame using the changed mode. The wireless terminal receives an eighth-rate CTX frame through a DTX connection and decodes the eighth-rate CTX frame accordingly. Similarly, a SID frame is not converted into multiple eighth-rate CTX frames. Instead, when a SID frame is followed by a period of no frames at all, a wireless network transmits to a wireless terminal the SID frame followed by a dummy eighth-rate frame per frame period. Each dummy eighth-rate frame may be filled with zeros or random data. The wireless terminal, upon receiving an eighth-rate frame after a prior SID frame, ignores the data in the frame and generates comfort noise based on the most recent SID frame received.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
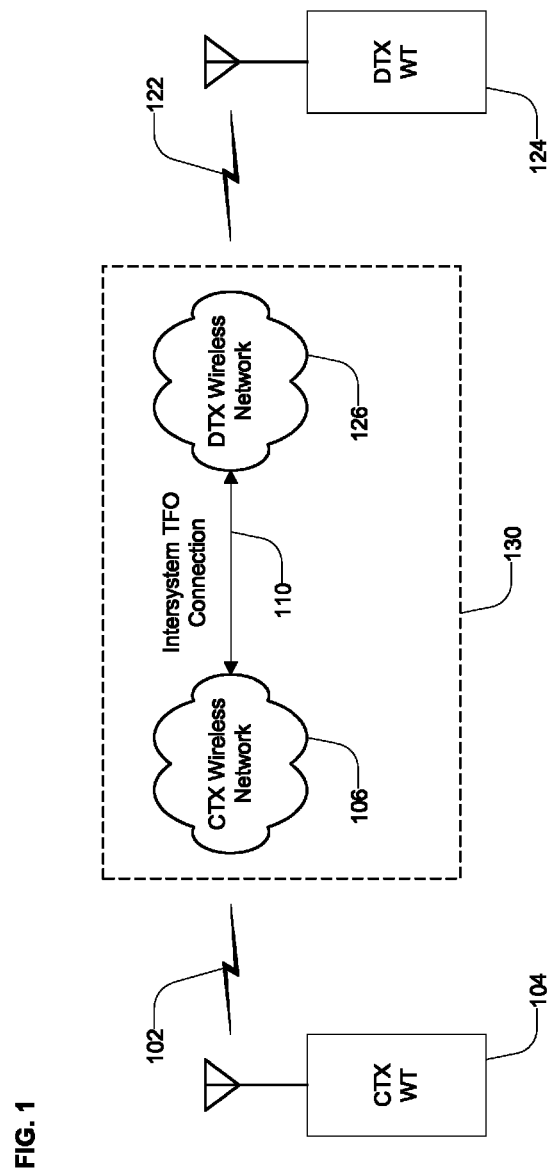
FIG. 1 shows a wireless communication system tandem-free operation between two wireless terminals through a wireless network.

FIG. 1 shows an illustrative wireless communication system including two wireless terminals (WT), 104 and 124, communicating in a tandem-free operation (TFO) mode through a wireless network 130. In the illustrative embodiment, the wireless network 130 includes two smaller wireless networks 106 and 126. The wireless communication shown provides TFO communication between two wireless terminals that communicate using different types of wireless interfaces or wireless channels. The terms "interface" and "channel" are used interchangeably herein, and refer generally to a wireless connection through which wireless terminals and wireless networks exchange information. Specifically, a continuous transmission (CTX) wireless terminal 104 communicates with a CTX wireless network 106 through a CTX wireless interface 102. A discontinuous transmission (DTX) wireless terminal 124 communicates with a DTX wireless network 126 through a DTX wireless interface 122. The two wireless networks, 106 and 126, provide a TFO mobile-to-mobile connection through an intersystem TFO connection 110. The TFO communication using different types of wireless interfaces, 102 and 122, are enabled and accommodated using the illustrative procedures described below.

Figure 2:
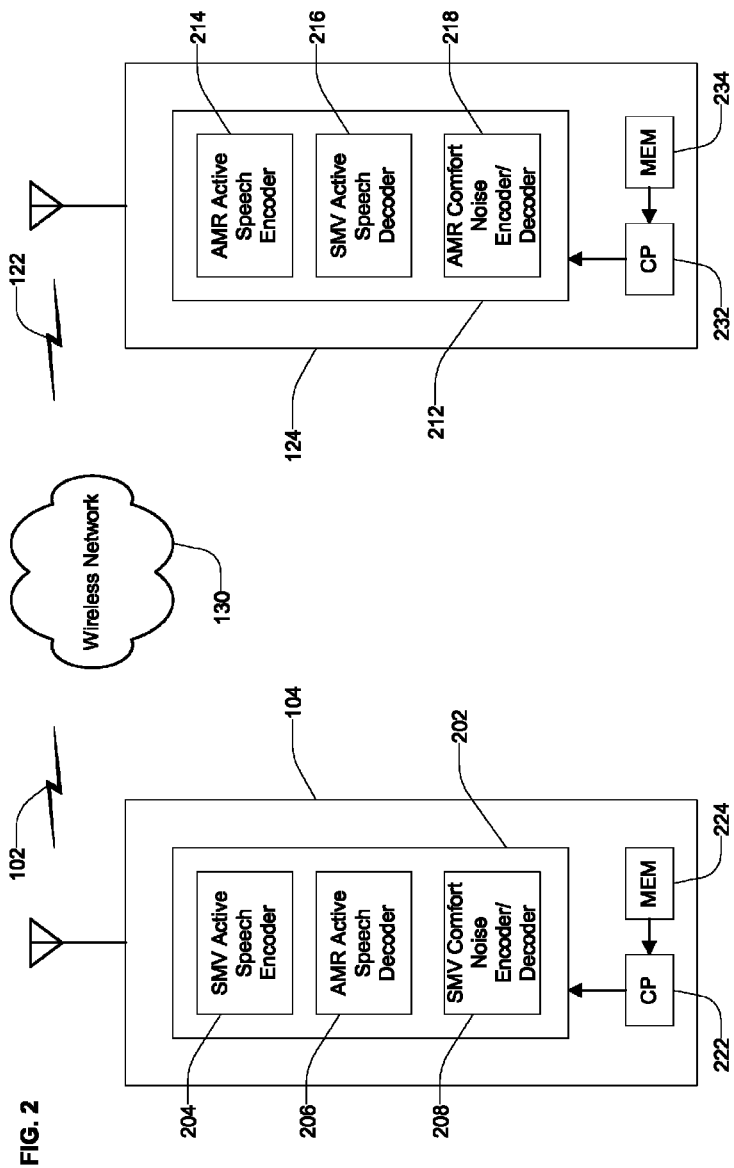
FIG. 2 shows a pair of wireless terminals configured to provide TFO operation using different wireless interfaces.

FIG. 2 shows a first illustrative embodiment of a pair of wireless terminals, 104 and 124, configured to provide TFO operation using different wireless interfaces, 102 and 122, through wireless network 130. In the illustrative example, CTX wireless terminal 104 includes a speech coder 202 configured to encode active speech frames in a format associated with a continuous transmission (CTX) wireless interface, to decode active speech frames in a format associated with a discontinuous transmission (DTX) wireless interface, and to encode and decode comfort-noise frames in a format associated with a CTX wireless interface. In the illustrative embodiment, the speech coder 202 includes a selectable mode vocoder (SMV) active speech encoder 204, an adaptive multirate (AMR) active speech decoder 206, and an SMV comfort noise encoder/decoder 208. As used herein, each encoder/decoder, such as SMV comfort noise encoder/decoder 208, includes an encoder portion and a decoder portion, wherein the encoder and decoder portions may be implemented separately or incorporated into a single device.

Comfort noise may also be referred to as inactive speech. In conversational speech, the input signal to a speech encoder is a sequence of speech bursts (active speech) and silence gaps (inactive speech). In noisy environments, silence gaps are filled with background acoustic noise. In an illustrative embodiment, speech coders 202 and 212 each include a voice/speech activity detection unit (not shown), which classifies each input signal frame as either active speech or inactive speech (silence or noise). Active speech data is provided to the corresponding active speech encoder, 204 or 213, and inactive speech is provided to the corresponding inactive speech encoder 202 or 218.

The CTX wireless terminal 104 transmits a frame to the wireless network 130 using CTX wireless interface 102 during every frame period. For example, where the CTX wireless interface 102 is a cdma2000 interface having a frame duration of 20 milliseconds, the CTX wireless terminal 104 transmits a frame to at least one base station within wireless network 130 every 20 milliseconds. Similarly, the CTX wireless terminal 104 receives a cdma2000 frame every 20 milliseconds. Each frame is transmitted or received during each frame period at one of a predetermined plurality of data rates. During periods of speech activity, CTX wireless terminal 104 transmits voice data at a maximal data rate within "full-rate" frames. In an illustrative embodiment, SMV active speech encoder 204 generates the full-rate frames. During periods of speech inactivity, CTX wireless terminal 104 transmits voice data at a lowest data rate within "eighth-rate" frames. In an illustrative embodiment, SMV comfort noise encoder/decoder 208 generates the eighth-rate comfort-noise frames. The receiving entity within wireless network 130 generally performs blind rate detection to determine the rate of the frame received through channel 102 during each frame period.

In an illustrative embodiment, CTX wireless terminal 104 receives AMR frames during periods of speech activity. CTX wireless terminal 104 receives CTX comfort noise frames during periods of speech inactivity, for example, SMV eighth-rate frames. The AMR frames are provided to AMR active speech decoder 206. The CTX comfort noise frames, for example SMV eighth-rate frames, are provided to the decoder portion of SMV comfort noise encoder/decoder 208.

In an illustrative embodiment, CTX wireless terminal 104 includes a control processor 222 and a memory 224. Speech coder 202 is connected to a control processor 222, which is connected to a memory 224. Memory 224 contains software or firmware executed by control processor 222. Memory 224 may be incorporated into a single device that includes control processor 222. During operation of CTX wireless terminal 104, control processor 222 configures and reconfigures speech coder 202 as needed and as discussed above.

On the other side of the mobile-to-mobile connection, DTX wireless terminal 124 includes a speech coder 212 configured to encode active speech frames in a format associated with a discontinuous transmission (DTX) wireless interface, to decode active speech frames in a format associated with a continuous transmission (CTX) wireless interface, and to encode and decode comfort-noise frames in a format associated with a DTX wireless interface. In the illustrative embodiment, the speech coder 212 includes an adaptive multi-rate (AMR) active speech encoder 214, a selectable mode vocoder (SMV) active speech decoder 216, and an AMR comfort noise encoder/decoder 218.

In accordance with the DTX wireless interface 122, DTX wireless terminal 124 transmits full-rate speech frames to the wireless network 130 during periods of speech activity and stops transmitting a data signal to the wireless network 130 during periods of speech inactivity. In an illustrative embodiment, AMR active speech encoder 214 generates the full-rate frames. At the beginning of a period of speech inactivity, DTX wireless terminal 124 transmits a single silence descriptor (SID) frame and either refrains entirely from transmitting any voice data frames for the remainder of the period of speech inactivity or transmits only periodic SID frames during that period. For example, a SID frame may be generated once every 8 or 24 consecutive inactive speech frame periods. In an illustrative embodiment, AMR comfort noise encoder/decoder 218 generates the SID frame.

In an illustrative embodiment, DTX wireless terminal 124 receives SMV frames during periods of speech activity. DTX wireless terminal 124 receives DTX comfort noise frames or no frames at all during periods of speech inactivity, for example, a SID frame followed by one or more empty frame periods. The SMV frames are provided to SMV active speech decoder 216. The DTX comfort noise frames are provided to the decoder portion of AMR comfort noise encoder/decoder 218.

In an illustrative embodiment, DTX wireless terminal 124 includes a control processor 232 and a memory 234. Speech coder 212 is connected to a control processor 232, which is connected to a memory 234. Memory 234 contains software or firmware executed by control processor 232. Memory 234 may be incorporated into a single device that includes control processor 232. During operation of DTX wireless terminal 124, control processor 232 configures and reconfigures speech coder 212 as needed and as discussed above.

Each vocoder 202 and 212 may utilize a speech activity detector (not shown) to determine when speech activity transitions from an active to an inactive state. For example, in vocoder 202, such a speech activity detector determines when to switch between SMV active speech encoder 204 and the encoder portion of SMV comfort noise encoder/decoder 208 and between AMR active speech decoder 206 and the decoder portion of SMV comfort noise encoder/decoder 208. Any or all of the speech coder components 204, 206, and 208 may be combined, and the speech activity detector may be integrated into one of those components. In vocoder 212, such a speech activity detector determines when to switch between AMR active speech encoder 214 and the encoder portion of AMR comfort noise encoder/decoder 218 and between SMV active speech decoder 216 and the decoder portion of AMR comfort noise encoder/decoder 218. Any or all of the speech coder components 214, 216, and 218 may be combined, and the speech activity detector may be integrated into one of those components.

Figure 3:
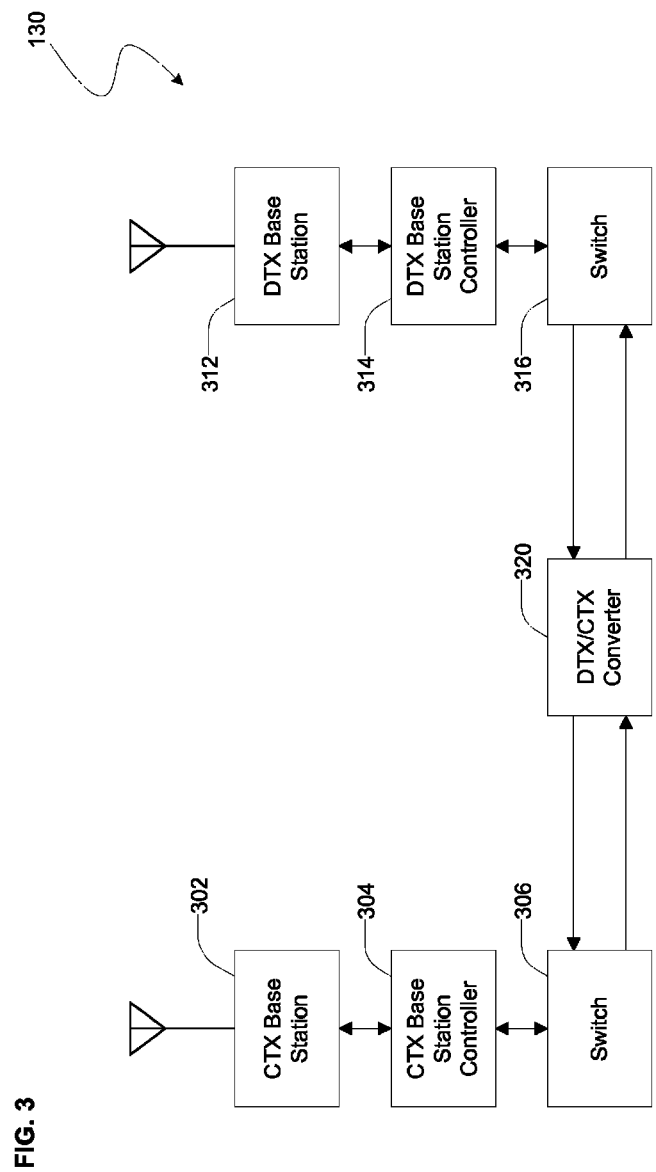
FIG. 3 shows a wireless network configured to provide TFO communication between the wireless terminals shown in FIG. 2.

FIG. 3 shows a wireless network 130 configured to accommodate TFO communication between wireless terminals configured as shown in FIG. 2. In an illustrative embodiment, CTX wireless terminal 104 communicates over a CTX wireless channel 102 with CTX base station 302. The functions performed by CTX base station 302 include modulation and demodulation of voice frames and power control. CTX base station is typically one of a plurality of CTX base stations communicating with and controlled by CTX base station controller 304. CTX base station controller 304 typically performs frame selection, coordinates handoff procedures, and performs voice frame encoding and decoding using voice coders (not shown).

Similarly, DTX wireless terminal 104 communicates over a DTX wireless channel 102 with DTX base station 312. The functions performed by DTX base station 312 include modulation and demodulation of voice frames and power control. DTX base station is typically one of a plurality of DTX base stations communicating with and controlled by DTX base station controller 314. DTX base station controller 314 typically performs frame selection, coordinates handoff procedures, and performs voice frame encoding and decoding using voice coders (not shown).

Wireless network 130 includes a DTX/CTX converter 320 that converts comfort noise frames from a DTX to a CTX format and from a CTX to a DTX format. Specifically, DTX/CTX converter 320 converts CTX comfort noise frames received from switch 306 into DTX comfort noise format and provides the resultant DTX comfort noise frames to switch 316. In the other direction, DTX/CTX converter 320 converts DTX comfort noise frames received from switch 316 into CTX comfort noise format and provides the resultant CTX comfort noise frames to switch 306. DTX/CTX converter 320 may be a standalone network unit as shown or may be integrated into a switch 306 or 316, into a base station controller 304 or 314, or into a base station 302 or 312. Alternatively, DTX/CTX converter 320 may be broken into two separate components, one performing strictly DTX-to-CTX conversion and the other performing strictly CTX-to-DTX conversion. These two separate components may then be incorporated into separate components, for example with one residing within CTX base station controller 304 and the other residing within DTX base station controller 314.

In order to convert DTX comfort noise frames into CTX comfort noise frames, DTX/CTX converter 320 monitors the frames being sent from switch 316 to switch 306. Upon identifying a SID frame, DTX/CTX converter 320 replaces the SID frame with a CTX comfort-noise frame, for example an eighth-rate comfort noise frame. After receiving this first SID frame, and generally until the resumption of active speech or until another periodic SID frame is received, DTX/CTX converter 320 receives no frame at all. During this period, DTX/CTX converter 320 generates a CTX comfort-noise frame during each frame period.

In order to convert CTX comfort noise frames into DTX comfort noise frames, DTX/CTX converter 320 monitors the frames being sent from switch 306 to switch 316. Upon identifying a first CTX comfort-noise frame, such as an eighth-rate frame, DTX/CTX converter 320 generates a DTX comfort-noise frame, for example a SID frame. Thereafter, and generally until the resumption of active speech, DTX/CTX converter 320 ignores any CTX comfort-noise frame received. In an alternate embodiment, DTX/CTX converter 320 buffers and monitors received CTX comfort-noise frames and uses the comfort-noise data to generate periodic SID frames provided to switch 306. In an illustrative embodiment, DTX/CTX converter 320 converts frames between DTX and CTX formats as described in U.S. Patent Application Publication No. 2002/0101844 A1, published Aug. 1, 2002.

In order to accurately determine when conversion of frames is needed, DTX/CTX converter 320 may require information obtainable only through the air interface and independently from information contained within the voice data packets. For example, in an illustrative embodiment, blind data rate detection information obtained by CTX base station 302 is forwarded through CTX base station controller 304 and switch 306 to DTX/CTX converter 320. Forwarding this information allows DTX/CTX converter 320 to perform appropriate conversions on comfort noise frames while forwarding full-rate voice data frames without conversion. Similarly, rate information received by DTX base station 312 or DTX base station controller 314 that is not discernable from data within speech frames sent from switch 316 to DTX/CTX converter 320 may be provided to DTX/CTX converter 320 along with the speech frames.

Figure 4:
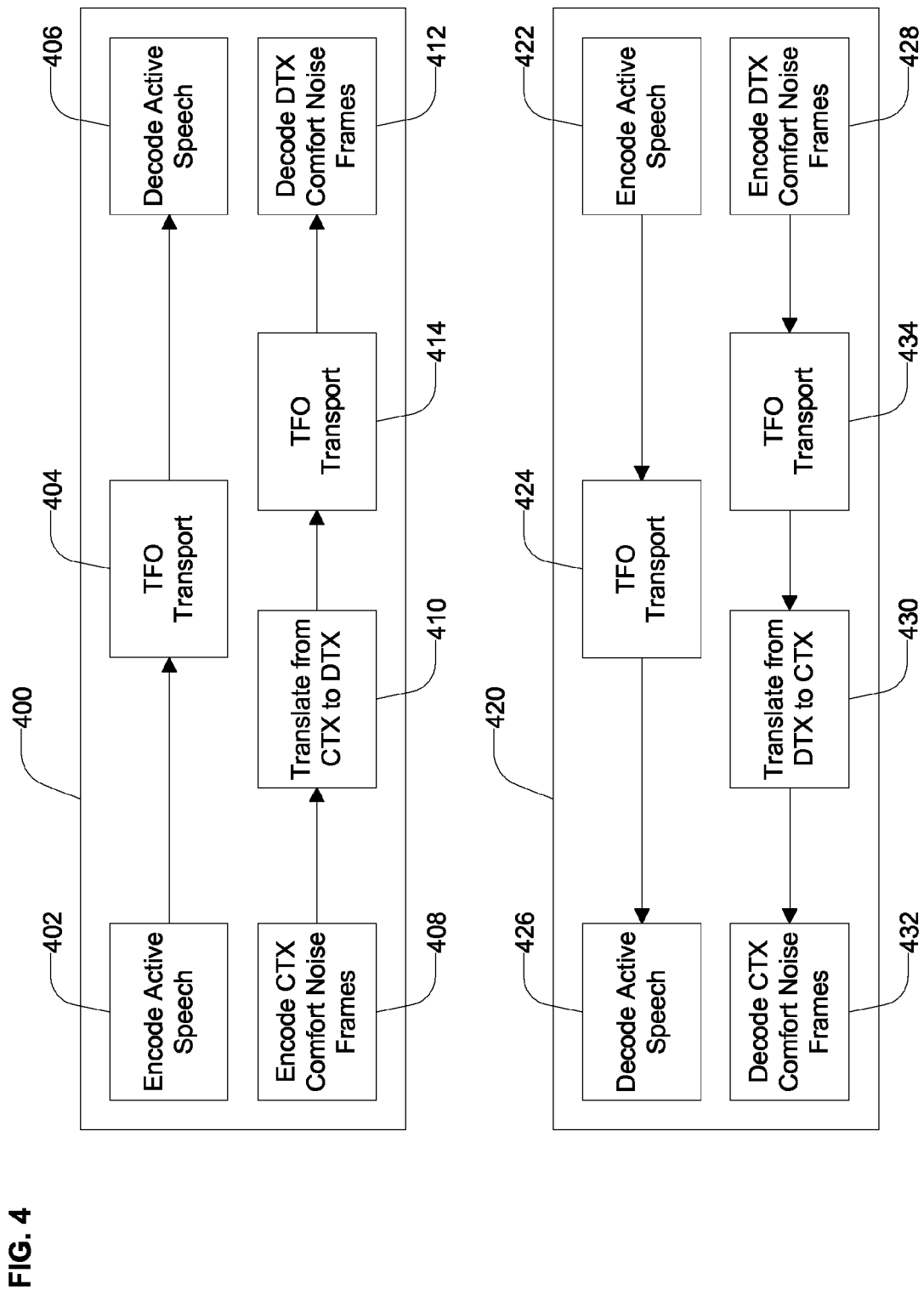
FIG. 4 is a diagram showing a method of providing TFO communication using DTX/CTX conversion.

FIG. 4 is a diagram showing an illustrative method of providing TFO communication using DTX/CTX conversion. Specifically, process 400 shows the acts performed in sending voice data from a CTX wireless terminal such as CTX wireless terminal 104 to a DTX wireless terminal such as DTX wireless terminal 124. Process 420 shows the acts performed in sending voice data from a DTX wireless terminal such as DTX wireless terminal 124 to a CTX wireless terminal such as CTX wireless terminal 104.

In an illustrative embodiment of process 400, active speech data is treated differently than inactive speech data (comfort noise). At 402, active speech data is encoded into an active speech frame in the CTX wireless terminal 104, and the resultant active speech frame is transported without alteration at 404 through a TFO connection. Upon arrival, the active speech frame is decoded in the DTX wireless terminal 124. In contrast, inactive speech data, or comfort noise, is encoded into CTX comfort noise frames at 408, translated into DTX format at 410, transported through a TFO connection at 414, and decoded in DTX format at 412. Translation 410 and TFO transport 414 may be performed in either order without departing from the described embodiment. Specifically, translation 410 could occur either before, after, or during TFO transport 414. In an illustrative embodiment, and as described above, the first of a series of eighth-rate CTX comfort noise frames is converted into a SID frame, and the subsequent continuous series of non-active-speech frames are either ignored or used to generate subsequent, periodic SID frames.

In an illustrative embodiment of process 420, and as with process 400, active speech data is treated differently than inactive speech data (comfort noise). At 422, active speech data is encoded into an active speech frame in the DTX wireless terminal 124, and the resultant active speech frame is transported without alteration at 424 through a TFO connection. Upon arrival, the active speech frame is decoded in the CTX wireless terminal 104. In contrast, inactive speech data, or comfort noise, is encoded into DTX comfort noise frames at 428, transported through a TFO connection at 434, translated into CTX format at 430, and then decoded in CTX format at 432. Translation 430 and TFO transport 434 may be performed in either order without departing from the described embodiment. Specifically, translation 430 could occur either before, after, or during TFO transport 434. In an illustrative embodiment, and as described above, a first received SID frame is translated into a CTX eighth-rate frame. During each subsequent consecutive frame period during which no voice data frames are received, an eighth-rate comfort noise frame is generated at 430. The generation of eighth-rate frames at 430 continues until an active speech frame is generated at 422 or another SID frame is generated at 428.

Figure 5:
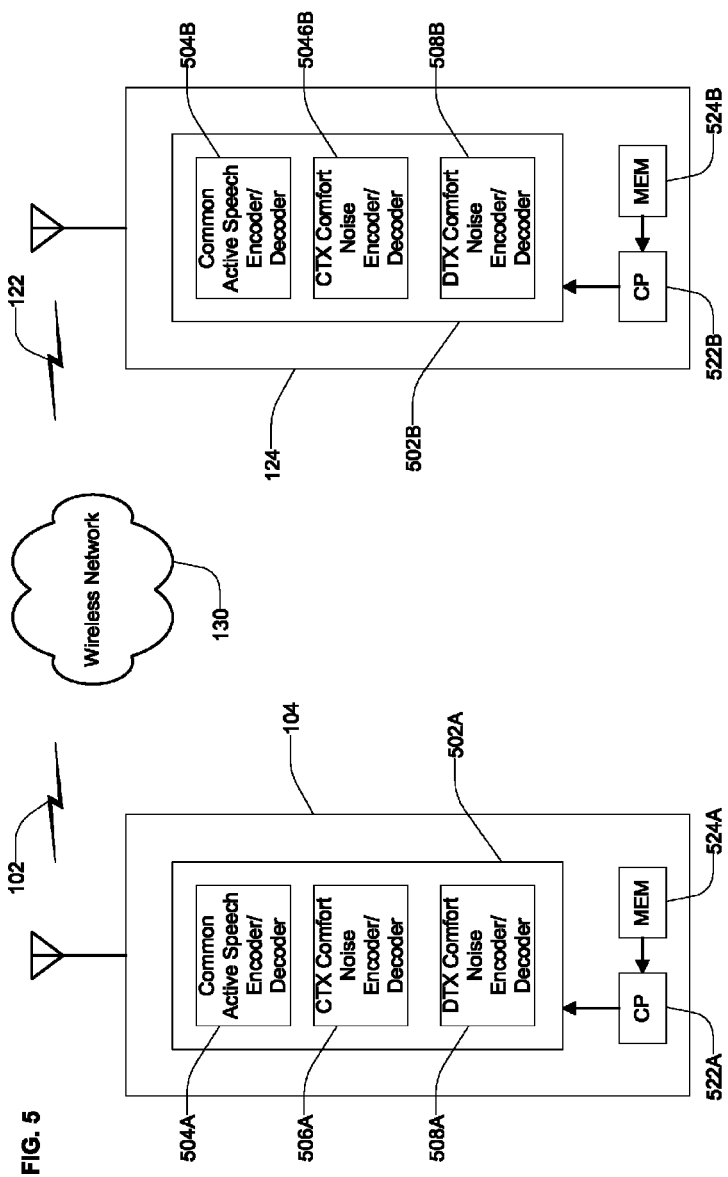
FIG. 5 shows a pair of wireless terminals configured to use a common active speech coder for both CTX and DTX connections.

FIG. 5 shows an alternate embodiment using a common active speech coder for both CTX and DTX connections. In an illustrative embodiment, both CTX wireless terminal 104 and DTX wireless terminal 124 include a common speech coder, 502A and 502B or collectively 502, of the same type. The common speech coder 502 includes a common active speech encoder/decoder 504 and both a CTX comfort noise encoder/decoder 506 and a DTX comfort noise encoder/decoder 508. The active speech encoder/decoder 504 is used for active speech regardless of the type of wireless interface being used. However, based on whether the wireless interface used by a wireless terminal is a DTX or CTX interface, selected functions of the DTX and CTX comfort noise coders, 506 and 508, are disabled. In an illustrative embodiment, each common speech coder 502 includes a voice/speech activity detection unit (not shown), which classifies each input signal frame as either active speech or inactive speech (silence or noise). Active speech data is provided to the corresponding active speech encoder, 204 or 213, and inactive speech is provided to whichever inactive speech encoder 506 or 508 is being used by the corresponding wireless terminal 104 or 124.

A first illustrative embodiment is used to provide TFO communication between the CTX wireless terminal 104 and the DTX wireless terminal 124 in much the same way as described in association with FIGS. 2, 3, and 4. Specifically, CTX wireless terminal 104 configures its speech coder 502A to utilize only the common active speech encoder/decoder 504A and the CTX comfort noise encoder/decoder 506A. In this CTX configuration, the DTX comfort noise encoder/decoder 508A is disabled and/or not used. In contrast, DTX wireless terminal 124 configures its speech coder 502B to utilize the common active speech encoder/decoder 504B and the DTX comfort noise encoder/decoder 508B. In this DTX configuration, the CTX comfort noise encoder/decoder 505B is disabled and/or not used. Wireless network 130 operates as described in association with FIGS. 2, 3, and 4. Specifically, wireless network 130 operates in a TFO mode and passes active speech frames between the two wireless terminals without change. Wireless network 130 converts CTX comfort noise frames received from CTX wireless terminal 104 into DTX format before transmission to DTX wireless terminal 124. Wireless network 130 converts DTX comfort noise frames received from DTX wireless terminal 124 into CTX format before transmission to CTX wireless terminal 104.

In an illustrative embodiment, each of CTX wireless terminal 104 and DTX wireless terminal 124 include a control processor 522 and a memory 524. Each speech coder 502 is connected to the corresponding control processor 522, which is connected to the corresponding memory 524. Thus, speech coder 502A is connected to control processor 522A, which is connected to memory 524A. Speech coder 502B is connected to control processor 522B, which is connected to memory 524B. Each memory 524 contains software or firmware executed by the corresponding control processor 522. One of skill in the art will recognize that control processor 522 and memory 524 may be incorporated into a single device without departing from the disclosed embodiments. During operation of the wireless terminal, control processor 522 configures its connected speech coder 502.

In the embodiments thus far described, wireless network 130 manipulates comfort noise frames in order to accommodate the different and generally incompatible wireless interfaces. An alternate approach to providing TFO voice services between wireless terminals that use different wireless interfaces will now be described. This alternate approach provides TFO communication between such different wireless terminals without conversion between CTX and DTX comfort noise frame formats.

Figure 6:
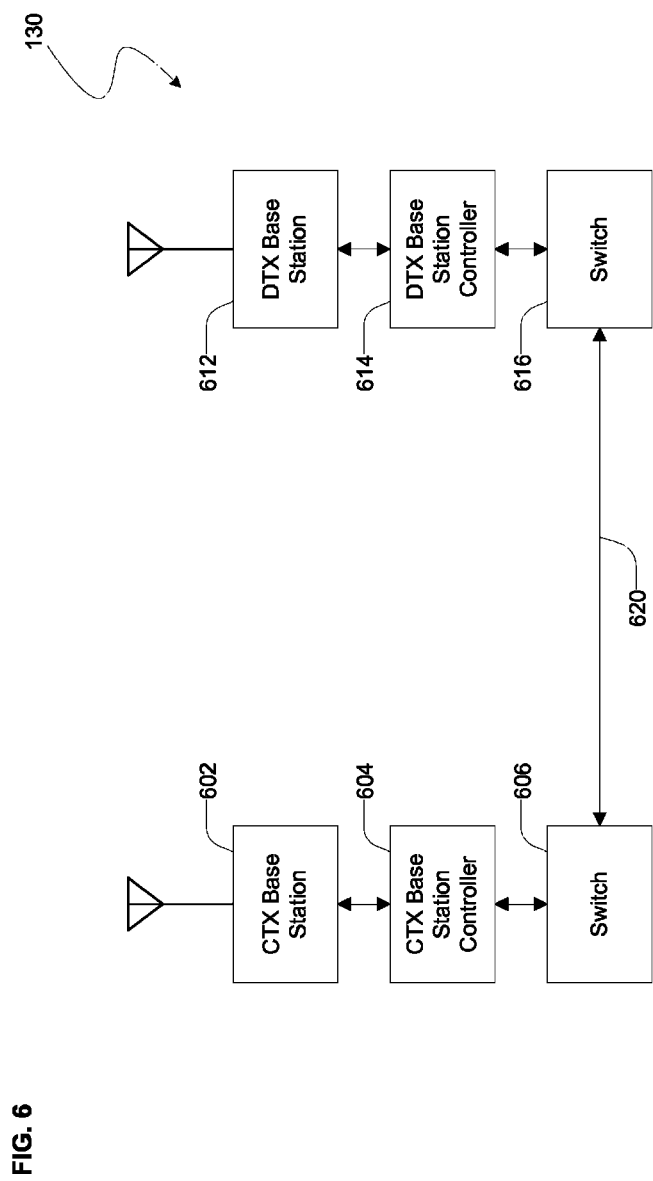
FIG. 6 shows a wireless network configured to provide TFO communication between wireless terminals using different wireless interfaces without performing CTX/DTX conversion.

FIG. 6 shows a wireless network 130 configured to provide TFO communication between wireless terminals using different wireless interfaces without performing CTX/DTX conversion. At least one CTX base station 602 is connected to a CTX base station controller 604, which is connected to a switch 606. At least one DTX base station 612 is connected to a DTX base station controller 614, which is connected to a switch 616. The two switches, 604 and 614, exchange voice data frames using a TFO connection 620.

Rather than converting any CTX frames into DTX format, variable rate CTX frames are placed unaltered within the payload of DTX frames. In an illustrative embodiment, whole SMV speech frames are placed into the payload portion of AMR frames and transmitted over a W-CDMA wireless interface to a DTX wireless terminal.

As the name adaptive multi-rate (AMR) implies, the rate of the AMR interface, and consequently the size of each AMR frame, can be adjusted as needed. Thus, the mode of the AMR interface can be adjusted in order to provide AMR speech frames of appropriate size to house each SMV speech frame inserted therein. In an illustrative embodiment, the AMR mode is adjusted as often as every frame so that the payload of each AMR speech frame is only as large as necessary to house the SMV frame to be carried within it. An AMR frame used to carry an active speech SMV frame will have a larger payload than an AMR frame used to carry an inactive speech (or comfort-noise) frame. Adjusting the AMR mode this way minimizes the wasted payload space associated with less-than-perfect matches between AMR speech frame payload and SMV speech frame size.

DTX base station 612 and DTX base station controller 614 are configured such that the size of a full-rate frame in the "downlink" direction (from the base station to the wireless terminal) may be different from the size of a full-rate frame in the "uplink" direction (from the wireless terminal to the base station). When accompanied by corresponding adjustments in transmit power, such frame-by-frame adjustments in data rate result in more efficient use of CDMA wireless capacity in the downlink direction.

In the DTX-to-CTX direction a different approach is used to maximize the efficiency of the use of downlink wireless capacity. Active speech frames and SID frames received at CTX base station controller 604 through switch 606 are transmitted from CTX base station in the smallest variable rate downlink frames that are still large enough to carry those frames. For example, an active speech frame may be sent in a full-rate frame, while a SID frame may be small enough to fit into a half-rate CTX frame. Without DTX-to-CTX conversion, there are frame periods in which CTX base station controller 604 does not receive any speech frame through switch 606 and TFO connection 620. For example, an AMR SID frame received through switch 606 at CTX base station controller 604 may be followed by one or more empty frame periods. Because a CTX interface requires that at least an eighth-rate frame be transmitted during every frame period, a "dummy" eighth-rate frame is generated during any period in which no frame is received from switch 606. The data within a dummy eighth-rate frame may be all-zeros, a fixed pattern, or a random or changing pattern. In an illustrative embodiment, CTX base station 602 is configured to generate a dummy eighth-rate frame during any frame period in which no downlink frame is otherwise available. Alternatively, CTX base station controller 604 may be configured to generate the dummy eighth-rate frame.

When providing TFO operation without DTX/CTX conversion, it is necessary for each wireless terminal 104 and 124 to operate in a way that is compatible with the configuration of wireless network 130. Specifically, the DTX wireless terminal 124 must be configured such that the downlink mode and the uplink mode, and hence the size of full-rate frames in the downlink and uplink directions, need not be equal during any particular frame period. Also, DTX wireless terminal 124 must be configured to encode comfort noise frames in a DTX format but to decode comfort noise frames received in a CTX format.

In an illustrative embodiment, the CTX and DTX wireless terminals 104 and 124 utilize the common speech coder 502 discussed in association with FIG. 5. Specifically, control processor 522A within CTX wireless terminal 104 configures the common speech coder 502A to encode and decode active speech using common active speech encoder/decoder 504A, to utilize the encoder portion of CTX comfort noise encoder/decoder 506A to encode comfort noise frames, and to utilize the decoder portion of DTX comfort noise encoder/decoder 508A to decode received comfort noise frames. Control processor 522B within DTX wireless terminal 124 configures the common speech coder 502B to encode and decode active speech using common active speech encoder/decoder 504B, to utilize the encoder portion of DTX comfort noise encoder/decoder 508B to encode comfort noise frames, and to utilize the decoder portion of CTX comfort noise encoder/decoder 506B to decode received comfort noise frames.

Alternatively, the two wireless terminals may use different formats to encode active speech, with each utilizing a type of active speech decoder that corresponds to the type of active speech encoder being used by the other side. For example, common active speech encoder/decoder 504A may be replaced with a hybrid active speech coder that encodes active speech using the SMV format but decodes active speech using the AMR format. On the other side, common active speech encoder/decoder 504B would be replaced with a hybrid active speech coder that encodes active speech using the AMR format but decodes active speech using the SMV format.

Figure 7:
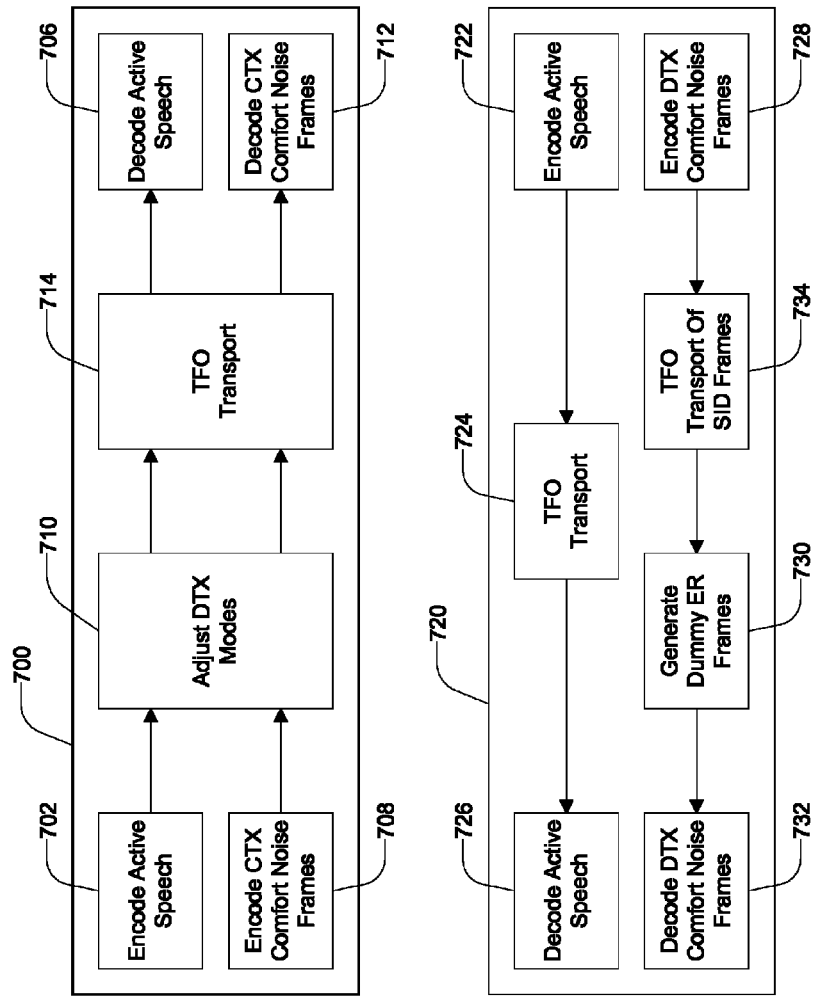
FIG. 7 is a diagram showing an illustrative method of providing TFO communication without using DTX/CTX conversion.

FIG. 7 is a diagram showing an illustrative method of providing TFO communication without using DTX/CTX conversion. Process 700 shows the acts performed in sending voice data from a CTX wireless terminal such as CTX wireless terminal 104 to a DTX wireless terminal such as DTX wireless terminal 124. Process 720 shows the acts performed in sending voice data from a DTX wireless terminal such as DTX wireless terminal 124 to a CTX wireless terminal such as CTX wireless terminal 104.

In an illustrative embodiment of process 700, CTX speech frames are transported from CTX wireless terminal 104 to DTX wireless terminal 124 using a TFO connection. CTX active and inactive speech data are treated similarly in formatting the speech data frames for transmission over a DTX wireless interface such as 122. At 702, active speech data is encoded into an active speech frame in the CTX wireless terminal 104. At 708, inactive speech is encoded into CTX comfort noise frames such as eighth-rate CTX frames. The CTX comfort noise frames are not converted into DTX format. Rather, the mode of DTX wireless interface 122 is adjusted, at 710, as necessary to accommodate changes in frame size between active speech frames generated at 702 and inactive speech frames generated at 708. In an illustrative embodiment, the mode of DTX wireless interface 122 is adjusted, at 710, as often as every frame by sending wireless control messages over DTX wireless interface 122.

The speech frames transmitted from CTX wireless terminal 104 to DTX wireless terminal 124 are transported between wireless networks using a TFO transport process at 714. DTX mode adjustments 710 and TFO transport 714 may be performed in either order without departing from the described embodiment. Specifically, DTX mode adjustments 710 could occur either before, after, or during TFO transport 714. Frame rate information may be inserted into TFO frames as needed to indicate to the receiving wireless network the rate of the over-the-air frame contained within each TFO frame. Such frame rate information may be inserted into the TFO frames, during TFO transport 714.

Upon arrival, each speech frame received by the DTX wireless terminal 124 is processed according to the mode of DTX wireless interface 122 at the time the frame was received. Specifically, frames received using a mode corresponding to a high data rate and large frame sizes are decoded at 706 as active speech. Frames received using a mode corresponding to a low data rate and small frame sizes are decoded at 712 as comfort noise.

In an illustrative embodiment of process 720, DTX active and inactive speech frames are transmitted from DTX wireless terminal 124 to CTX wireless terminal 104 using a TFO connection. DTX active speech frames are encoded at 722, incorporated into full-rate CTX over-the-air frames, and transported between the wireless networks at 724. The resulting full-rate CTX over-the-air frames are sent to CTX wireless terminal 104 through CTX wireless interface 102. DTX inactive speech frames are generated in a discontinuous fashion as discussed above. Specifically, at the beginning of a period of speech inactivity, and perhaps periodically thereafter, a SID frame is generated at 728 and transported between wireless networks using a TFO process at 734. Each SID frame is incorporated into a CTX over-the-air frame of appropriate size at 730. For example, if a SID frame is too large to fit into a quarter-rate CTX frame, but smaller than the ordinary payload of a CTX half-rate frame, then the SID frame is incorporated into a half-rate CTX over-the-air frame and transmitted at 730 to CTX wireless terminal 104. During the subsequent period of speech inactivity, when no DTX comfort noise frames are generated, "dummy" eighth-rate (ER) frames are generated at 730. As discussed above, SID frames received by CTX wireless terminal 104 are decoded at 732, but any voice data received ER frames is ignored by CTX wireless terminal 104. For example, such received ER frames are not provided to a speech coder within CTX wireless terminal 104.

One of skill in the art will appreciate that the modes shown in FIGS. 4 and 7 may be mixed without departing from the embodiments disclosed herein. Specifically, a wireless terminal is anticipated which performs CTX/DTX conversion in one direction but not the other. For example, a TFO connection may be established between CTX and DTX wireless terminals 104 and 124 using process 700 in the CTX-to-DTX direction and using process 420 in the DTX-to-CTX direction. Alternatively, a TFO connection may be established between CTX and DTX wireless terminals 104 and 124 using process 400 in the CTX-to-DTX direction and using process 720 in the DTX-to-CTX direction.

For clarity, various aspects, embodiments, and features of the invention have been described for a specific implementation for a W-CDMA system and a cdma2000 system. However, other fixed-rate, multi-rate and variable-rate systems and standards may advantageously be implemented or adopted to support the embodiments described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein, including control processors 222, 232, and 522, may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. Memory elements 524, 224, or 234 may be RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing tandem-free operation (TFO) communication between a first wireless terminal and a second wireless terminal, wherein the first wireless terminal encodes active speech using a first wideband speech coder associated with a first type of wireless interface and generates active speech frames having a first format, wherein the second wireless terminal encodes active speech using a second wideband speech coder associated with a second type of wireless interface and generates active speech frames having a second format, wherein the first and second wideband speech coders each sample voice signals at a sampling rate greater than 8,000 samples per second, wherein the first format is different from the second format, and wherein the first type of wireless interface is different from the second type of wireless interface, the method comprising:

encoding, at the first wireless terminal, first active speech data to generate an active speech frame having the first format;

decoding, at the first wireless terminal, a received speech frame using the first speech coder or the second speech coder based on whether the speech data in the received speech frame is active speech or inactive speech; and sending inactive speech frames encoded with the first format to a network device for conversion to the second format.

2. The method of claim 1 further comprising:

encoding, at the first wireless terminal, inactive speech frames in accordance with the first type of wireless interface; and decoding, at the first wireless terminal, inactive speech frames in accordance with the first type of wireless interface.

3. An apparatus comprising:

a speech encoder configured to encode speech data in accordance with a first speech coding format;

a first speech decoder configured to decode speech data in accordance with the first speech coding format; and a second speech decoder configured to decode speech data in accordance with a second speech coding format, wherein the first speech coding format is different from the second speech coding format, wherein a received speech frame is decoded using the first speech decoder or the second speech decoder based on whether speech data in the received speech frame is active speech or inactive speech, wherein the apparatus sends inactive speech data encoded with the first speech coding format to a network device for conversion to the second speech coding format.

4. The apparatus of claim 3 wherein the speech encoder is a comfort noise speech encoder and the first speech decoder is a comfort noise speech decoder.

5. The apparatus of claim 3 wherein the speech encoder is an active speech encoder.

6. The apparatus of claim 3 wherein the speech encoder is a wideband active speech encoder and the second speech decoder is a wideband active speech decoder.

7. The apparatus of claim 3 wherein the first speech coding format is an adaptive multi-rate (AMR) format and the second speech coding format is a selectable mode vocoder (SMV) format.

8. The apparatus of claim 3 wherein the first speech coding format is a selectable mode vocoder (SMV) format and the second speech coding format is an adaptive multi-rate (AMR) format.

9. The apparatus of claim 3 wherein the first speech coding format is a discontinuous transmission (DTX) format and the second speech coding format is a continuous transmission (CTX) format.

10. The apparatus of claim 3 wherein the first speech coding format is a continuous transmission (CTX) format and the second speech coding format is a discontinuous transmission (DTX) format.

11. A method of providing tandem-free operation (TFO) communication between a first wireless terminal communicating through a first type of wireless interface and a second wireless terminal communicating through a second type of wireless interface, wherein the first type is different from the second type, the method comprising:

encoding, at the first wireless terminal, and in accordance with a first speech coding format, speech data to be transmitted through a wireless channel;

decoding, at the first wireless terminal, a received speech frame in accordance with the first speech coding format or a second speech coding format based on whether the speech data in the speech frame is active speech or inactive speech, wherein the first speech coding format is different from the second speech coding format; and sending inactive speech data encoded with the first speech coding format to a network device for conversion to the second speech coding format.

12. The method of claim 11 wherein the encoding is comfort noise encoding and the decoding of the inactive speech data is comfort noise decoding.

13. The method of claim 11 wherein the speech encoding is active speech encoding.

14. The method of claim 11 wherein the speech encoding is wideband active speech encoding and the speech decoding of active speech data is wideband active speech decoding.

15. The method of claim 11 wherein the first speech coding format is an adaptive multi-rate (AMR) format and the second speech coding format is a selectable mode vocoder (SMV) format.

16. The method of claim 11 wherein the first speech coding format is a selectable mode vocoder (SMV) format and the second speech coding format is an adaptive multi-rate (AMR) format.

17. The method of claim 11 wherein the first speech coding format is a discontinuous transmission (DTX) format and the second speech coding format is a continuous transmission (CTX) format.

18. The method of claim 11 wherein the first speech coding format is a continuous transmission (CTX) format and the second speech coding format is a discontinuous transmission (DTX) format.

19. A computer-readable medium comprising instructions which, when executed by a processor, cause said processor to configure a speech coder to perform steps of a method of providing tandem-free operation (TFO) communication between a first wireless terminal communicating through a first type of wireless interface and a second wireless terminal communicating through a second type of wireless interface, wherein the first type is different from the second type, the method comprising:

encoding, at the first wireless terminal, and in accordance with a first speech coding format, speech data received through a wireless channel;

decoding, at the first wireless terminal, a received speech frame in accordance with the first speech coding format or a second speech coding format based on whether the speech data in the speech frame is active speech or inactive speech, wherein the first speech coding format is different from the second speech coding format; and sending inactive speech data encoded with the first speech coding format to a network device for conversion to the second speech coding format.

20. An apparatus for providing tandem-free operation (TFO) communication between a first wireless terminal communicating through a first type of wireless interface and a second wireless terminal communicating through a second type of wireless interface, wherein the first type is different from the second type, the apparatus comprising:

means for encoding, at the first wireless terminal, speech data through a wireless channel in accordance with a first speech coding format;

means for decoding, at the first wireless terminal, a received speech frame in accordance with the first speech coding format or a second speech coding format based on whether the speech data in the received speech frame is active speech or inactive speech, wherein the first speech coding format is different from the second speech coding format; and means for sending inactive speech data encoded with the first speech coding format to a network device for conversion to the second speech coding format.

21. A speech coder comprising:

an active speech encoder configured to encode active speech data in accordance with a first speech coding format;

a first speech decoder configured to decode speech data in accordance with a second speech coding format, wherein the first speech coding format is different from the second speech coding format;

an inactive speech encoder configured to encode inactive speech data in accordance with the first speech coding format, wherein the inactive speech data encoded with the first speech coding format is sent to a network device for conversion to the second speech coding format; and a second speech decoder configured to decode speech data in accordance with the first speech coding format, wherein a received speech frame is decoded using the first speech decoder or the second speech decoder based on whether speech data in the received speech frame is active speech or inactive speech.

22. The speech coder of claim 21 wherein the first speech coding format is an adaptive multi-rate (AMR) format and the second speech coding format is a selectable mode vocoder (SMV) format.

23. The speech coder of claim 21 wherein the first speech coding format is a selectable mode vocoder (SMV) format and the second speech coding format is an adaptive multi-rate (AMR) format.

24. The speech coder of claim 21 wherein the active speech encoder is a wideband active speech encoder, and wherein the active first speech decoder is a wideband active speech decoder.

25. The speech coder of claim 21 wherein the first speech coding format is a discontinuous transmission (DTX) format and the second speech coding format is a continuous transmission (CTX) format.

26. The speech coder of claim 21 wherein the first speech coding format is a continuous transmission (CTX) format and the second speech coding format is a discontinuous transmission (DTX) format.

27. A speech coder comprising:

an active speech encoder configured to encode active speech data in accordance with a speech coding format;

an active speech decoder configured to decode active speech data in accordance with the speech coding format;

a first inactive speech encoder configured to encode inactive speech data in accordance with a continuous transmission (CTX) format;

a first inactive speech decoder configured to decode inactive speech data in accordance with the CTX format;

a second inactive speech encoder configured to encode inactive speech data in accordance with a discontinuous transmission (DTX) format; and a second inactive speech decoder configured to decode inactive speech data in accordance with the DTX format.

* * * * *